United States Patent
Schneider et al.

(10) Patent No.: US 10,880,317 B2
(45) Date of Patent: Dec. 29, 2020

(54) SYSTEMS AND METHODS FOR CLUSTER-BASED NETWORK THREAT DETECTION

(71) Applicant: Crypteia Networks S.A., Athens (GR)

(72) Inventors: Mordechay Schneider, Raanana (IL); Giorgos Gkroumas, Athens (GR); Theocharis Tsigkritis, Athens (GR)

(73) Assignee: CRYPTEIA NETWORKS S.A., Athens (GR)

( * ) Notice: Subject to any disclaimer, the term of this patent is extended or adjusted under 35 U.S.C. 154(b) by 442 days.

(21) Appl. No.: 15/854,425

(22) Filed: Dec. 26, 2017

(65) Prior Publication Data

US 2018/0183821 A1 Jun. 28, 2018

Related U.S. Application Data

(60) Provisional application No. 62/439,332, filed on Dec. 27, 2016.

(51) Int. Cl.
*H04L 29/06* (2006.01)
*G06F 16/28* (2019.01)

(52) U.S. Cl.
CPC ........ *H04L 63/1416* (2013.01); *G06F 16/285* (2019.01)

(58) Field of Classification Search
CPC ............. H04L 63/1416; H04L 63/1441; H04L 63/1425; G06F 16/285
See application file for complete search history.

(56) References Cited

U.S. PATENT DOCUMENTS

| | | | | |
|---|---|---|---|---|
| 7,742,982 B2* | 6/2010 | Chaudhuri | ............. | G06Q 20/10 705/38 |
| 2014/0173739 A1* | 6/2014 | Ahuja | ................. | H04L 63/1433 726/25 |
| 2015/0163242 A1* | 6/2015 | Laidlaw | ................. | G06N 7/023 726/22 |
| 2015/0371044 A1* | 12/2015 | Horne | ................. | H04L 63/1408 726/25 |
| 2016/0378978 A1* | 12/2016 | Singla | ................... | G06F 21/554 726/23 |
| 2017/0026391 A1* | 1/2017 | Abu-Nimeh | .......... | G06F 21/552 |
| 2017/0258383 A1* | 9/2017 | Dagum | .................... | A61B 5/16 |
| 2017/0293748 A1* | 10/2017 | Kurupati | ............. | H04L 63/1425 |
| 2018/0025157 A1* | 1/2018 | Titonis | ............. | H04W 12/1208 726/24 |
| 2018/0139227 A1* | 5/2018 | Martin | ................ | H04L 63/1433 |
| 2018/0183821 A1* | 6/2018 | Schneider | ............. | G06F 16/285 |

* cited by examiner

*Primary Examiner* — Saleh Najjar
*Assistant Examiner* — Devin E Almeida
(74) *Attorney, Agent, or Firm* — EIP US LLP

(57) ABSTRACT

Detecting threats in a network are provided. A network security monitor obtains records for entities that access a network. The records include attributes associated with the entities. The network security monitor generates clusters from the records using a matching process. The network security monitor classifies a first cluster as a threat cluster. The network security monitor receives, subsequent to generating the plurality of clusters, a record from an entity that access the network. The network security monitor assigns the record to the first cluster using the matching process. The network security monitor detects, responsive to assigning the record to the first cluster, a threat associated with the entity.

18 Claims, 9 Drawing Sheets

SYSTEMS AND METHODS FOR CLUSTER-BASED NETWORK THREAT DETECTION

CROSS-REFERENCES TO RELATED APPLICATIONS

This application claims the benefit of priority under 35 U.S.C. § 119 to U.S. Provisional Patent Application No. 62/439,332, filed Dec. 27, 2016, and titled "SYSTEMS AND METHODS FOR CLUSTER-BASED NETWORK THREAT DETECTION," which is hereby incorporated herein by reference in its entirety.

FIELD OF THE DISCLOSURE

This disclosure generally relates to systems and methods for a network security monitor that identifies infected network infrastructure.

BACKGROUND OF THE DISCLOSURE

Computer networks or systems may have vulnerabilities that can be exploited by an attack or a threat. An exploited vulnerability can adversely affect the operation of the computer network, such as by slowing down the flow of data over the computer network, or preventing access to resources of the computer system.

BRIEF SUMMARY OF THE DISCLOSURE

The present disclosure relates generally to a network security monitor that performs cluster-based network threat detection. In network infrastructure that can include one or more distributed or centralized entities (e.g., network nodes, network elements, network components, or networked devices), it may be challenging to obtain or collect information from each of the network entities. It may be challenging to collect information (or the same information) from one or more network entities for various reasons, such as the network entity may be offline, damaged, busy processing other requests, improperly configured, or compromised. It may be challenging for the network security monitor to detect or determine threatful behavior corresponding to a network entity without collecting information from the network entity. Thus, it may be challenging to determine or detect threatful behavior with partial information from the network infrastructure.

Systems and methods of the present solution provide a network security monitor that can use partial information to detect upcoming threatful behaviors that can affect network infrastructure or network elements. The network security monitor can be configured with a dynamic clustering approach that facilitates extracting clusters from collected data. The network security monitor can combine the clusters with a pattern recognition technique, such as a k-Nearest Neighbors ("k-NN") technique to classify new upcoming behaviors.

At least one aspect is directed to a method of detecting threats in a network. The method can include a network security monitor obtaining a plurality of records for a plurality of entities that accesses a network. The plurality of records can include attributes associated with the one or more entities. The method can include the network security monitor generating a plurality of clusters from the plurality of records using a matching process. The method can include the network security monitor classifying a first cluster of the plurality of clusters as a threat cluster. The method can include the network security monitor receiving, subsequent to generating the plurality of clusters, a record from an entity that communicates via the network. The method can include the network security monitor assigning the record to the first cluster using the matching process. The method can include the network security monitor detecting, responsive to assigning the record to the first cluster, a threat associated with the entity.

In some embodiments, the entity is different from the plurality of entities used to generate the plurality of clusters.

In some embodiments, the network security monitor can select one of fixed cluster construction or variable cluster construction to generate the plurality of clusters. The network security monitor can identify, responsive to the selection, a number of clusters to generate. The network security monitor can generate, responsive to identifying the number of clusters, the plurality of clusters corresponding to the number of clusters.

In some embodiments, the matching process includes at least one of a fuzzy logic algorithm or a k-nearest neighbors technique. The network security monitor can weight the attributes associated with the one or more entities, and generate the clusters using the matching process and the weighted attributes.

In some embodiments, the method includes performing a tuning process to identify, via a multivariable loop, one or more variables to use to match the record with the first cluster corresponding to the threat cluster.

In some embodiments, the method includes determining that a first record of the plurality of records is a mismatch with the first cluster. The network security monitor can generate a second cluster of the plurality of clusters. The network security monitor can assign the first record of the plurality of records to the second cluster.

In some embodiments, the method includes determining that an attribute of the record is a non-numeric attribute. The method can include using Boolean logic to match the attribute with the first cluster.

In some embodiments, the method can include determining that an attribute of the record comprises a numeric value. In some embodiments, the method can include using fuzzy logic to match the numeric value of the attribute with the first cluster.

In some embodiments, the method can include determining that an attribute of the record comprises a numeric value. The method can include determining an average value for the first cluster based on assigning the numeric value of the attribute of the record to the first cluster. The method can include updating a center value of the first cluster based on the average value.

In some embodiments, the method can include validating the first cluster based on comparing a ratio of threats to records with a threshold.

At least one aspect is directed to a system for detecting threats in a network. The system can include a network security monitor comprising one or more processors and memory. The network security monitor can include, execute, interface with, or otherwise communicate with a data collector, a cluster generator and a classifier. The network security monitor can be configured to obtain a plurality of records for a plurality of entities that accesses a network. The plurality of records can include attributes associated with the one or more entities. The network security monitor can be configured to generate a plurality of clusters from the plurality of records using a matching process. The network security monitor can be configured to classify a first cluster of the plurality of clusters as a threat cluster. The network security monitor can be configured to receive, subsequent to generating the plurality of clusters, a record from an entity that communicates via the network. The network security monitor can be configured to assign the record to the first cluster using the matching process. The network security monitor can be configured to detect, responsive to assigning the record to the first cluster, a threat associated with the entity.

In some embodiments, the entity is different from the plurality of entities used to generate the plurality of clusters.

In some embodiments, the network security monitor is further configured to select one of fixed cluster construction or variable cluster construction. The network security monitor can identify, responsive to the selection, a number of clusters to generate. The network security monitor can generate, responsive to identifying the number of clusters, the plurality of clusters corresponding to the number of clusters.

In some embodiments, the matching process includes at least one of a fuzzy logic algorithm or a k-nearest neighbors technique. The network security monitor can weight the attributes associated with the one or more entities, and generate the clusters using the matching process and the weighted attributes.

In some embodiments, the network security monitor is further configured to perform a tuning process to identify, via a multivariable loop, one or more variables to use to match the record with the first cluster corresponding to the threat cluster.

In some embodiments, the network security monitor is further configured to determine that a first record of the plurality of records is a mismatch with the first cluster. The network security monitor can generate a second cluster of the plurality of clusters. The network security monitor can assign the first record of the plurality of records to the second cluster.

In some embodiments, the network security monitor is further configured to determine that an attribute of the record is a non-numeric attribute. The network security monitor can use Boolean logic to match the attribute with the first cluster.

In some embodiments, the network security monitor is further configured to determine that an attribute of the record comprises a numeric value. The network security monitor can use fuzzy logic to match the numeric value of the attribute with the first cluster.

In some embodiments, the network security monitor is further configured to determine that an attribute of the record comprises a numeric value. The network security monitor can determine an average value for the first cluster based on assigning the numeric value of the attribute of the record to the first cluster. The network security monitor can update a center value of the first cluster based on the average value.

In some embodiments, the network security monitor is further configured to validate the first cluster based on comparing a ratio of threats to records with a threshold.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specification and their respective contents may be helpful: Section A describes a network environment and computing environment which may be useful for practicing embodiments described herein.

Section B describes embodiments of systems and methods for a network security monitor.

A. Computing and Network Environment

Figure 1A:
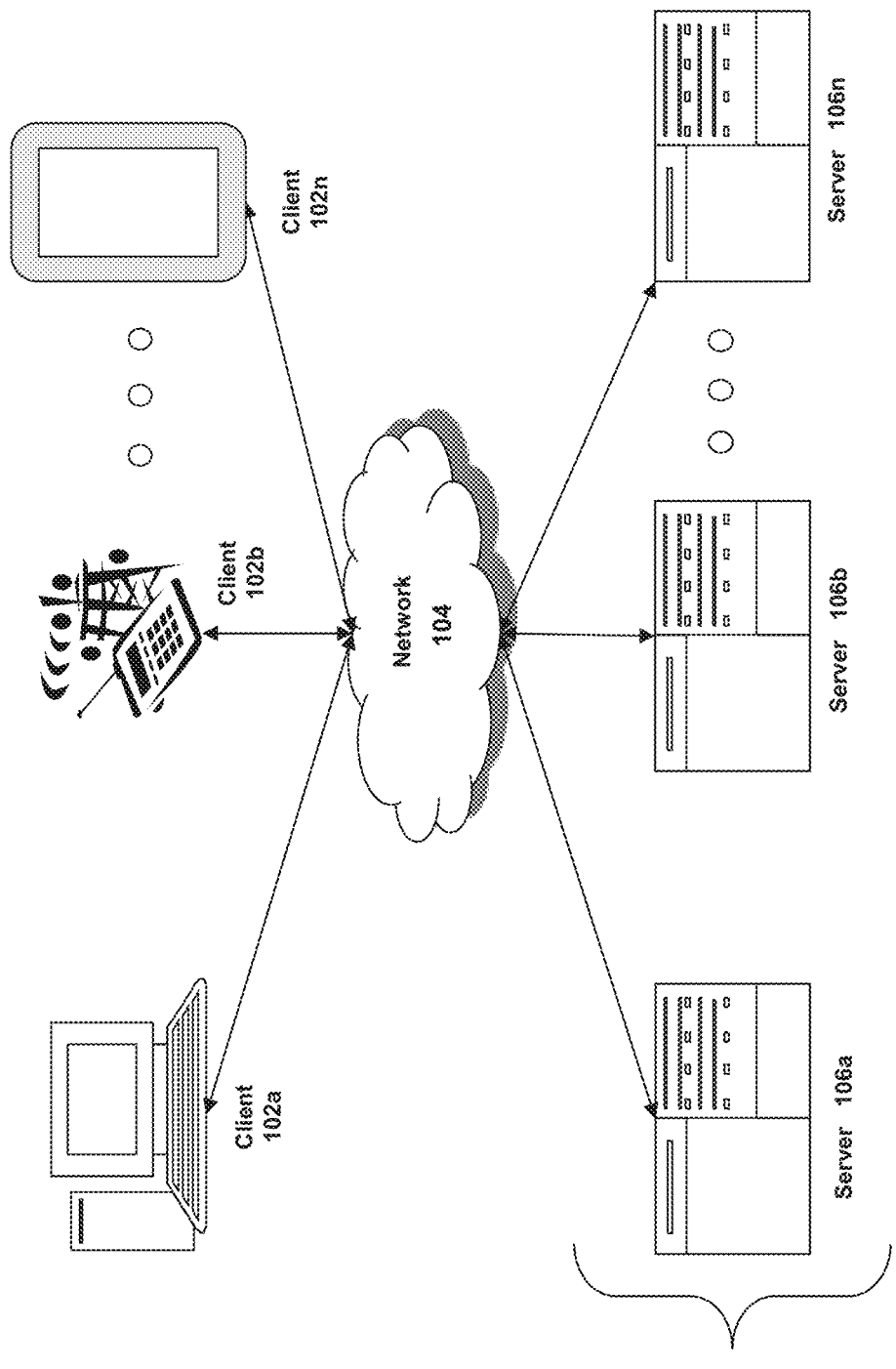
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and can include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 104 may be a type of a broadcast network, a telecommunications network, a data communication network, or a computer network.

In some embodiments, the system can include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 can include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 can include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors can include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors can include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
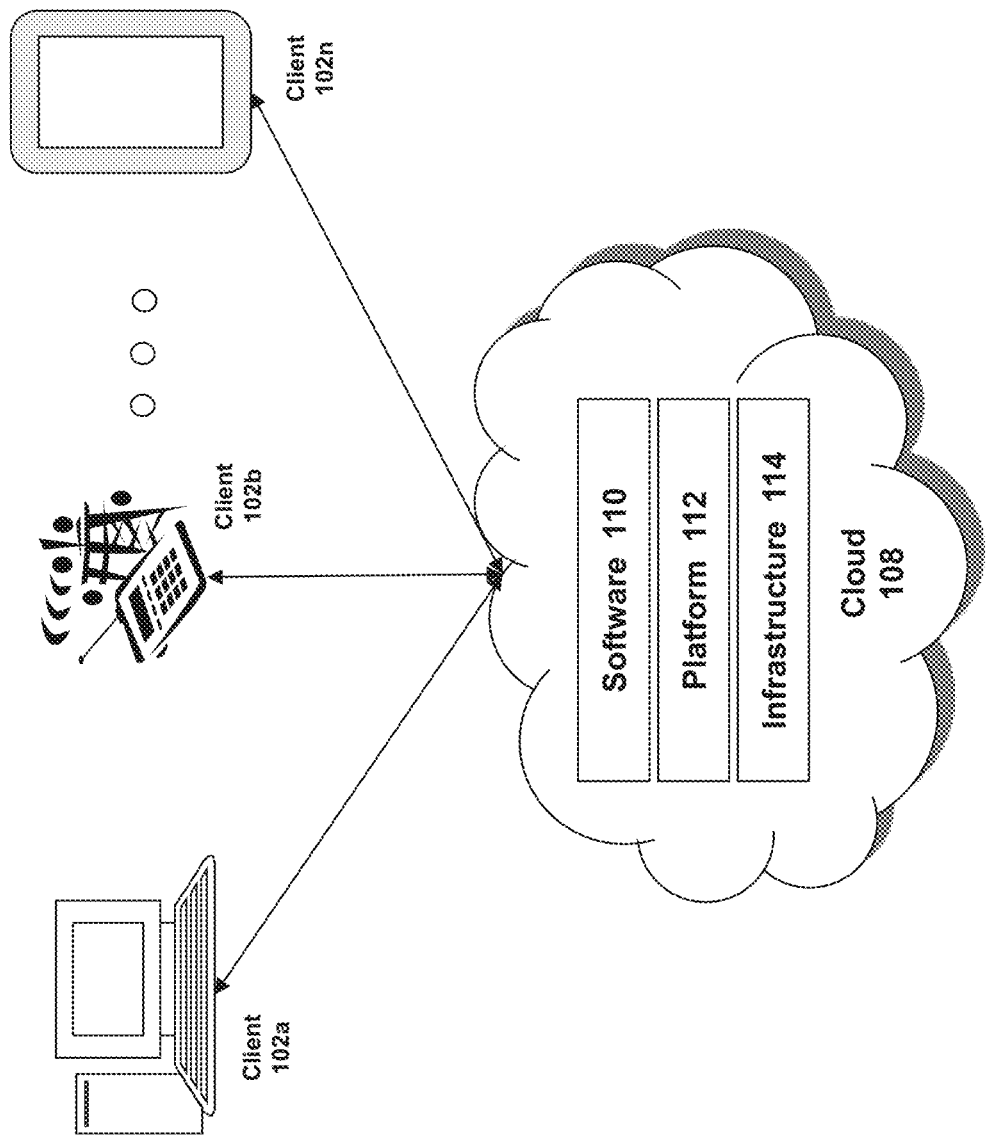
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment can include one or more clients 102a-102n, in communication with the cloud 108 over one or more networks 104. Clients 102 can include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 can include back end platforms, e.g., servers 106, storage, server farms or data centers.

The cloud 108 may be public, private, or hybrid. Public clouds can include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds can include private servers 106 that are physically maintained by clients 102 or owners of clients. Private clouds may be connected to the servers 106 over a private network 104. Hybrid clouds 108 can include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys can include various encryption standards such as, e.g., Advanced Encryption Standard (AES). Data resources may be sent over Transport Layer Security (TLS) or Secure Sockets Layer (SSL).

Figure 1C:
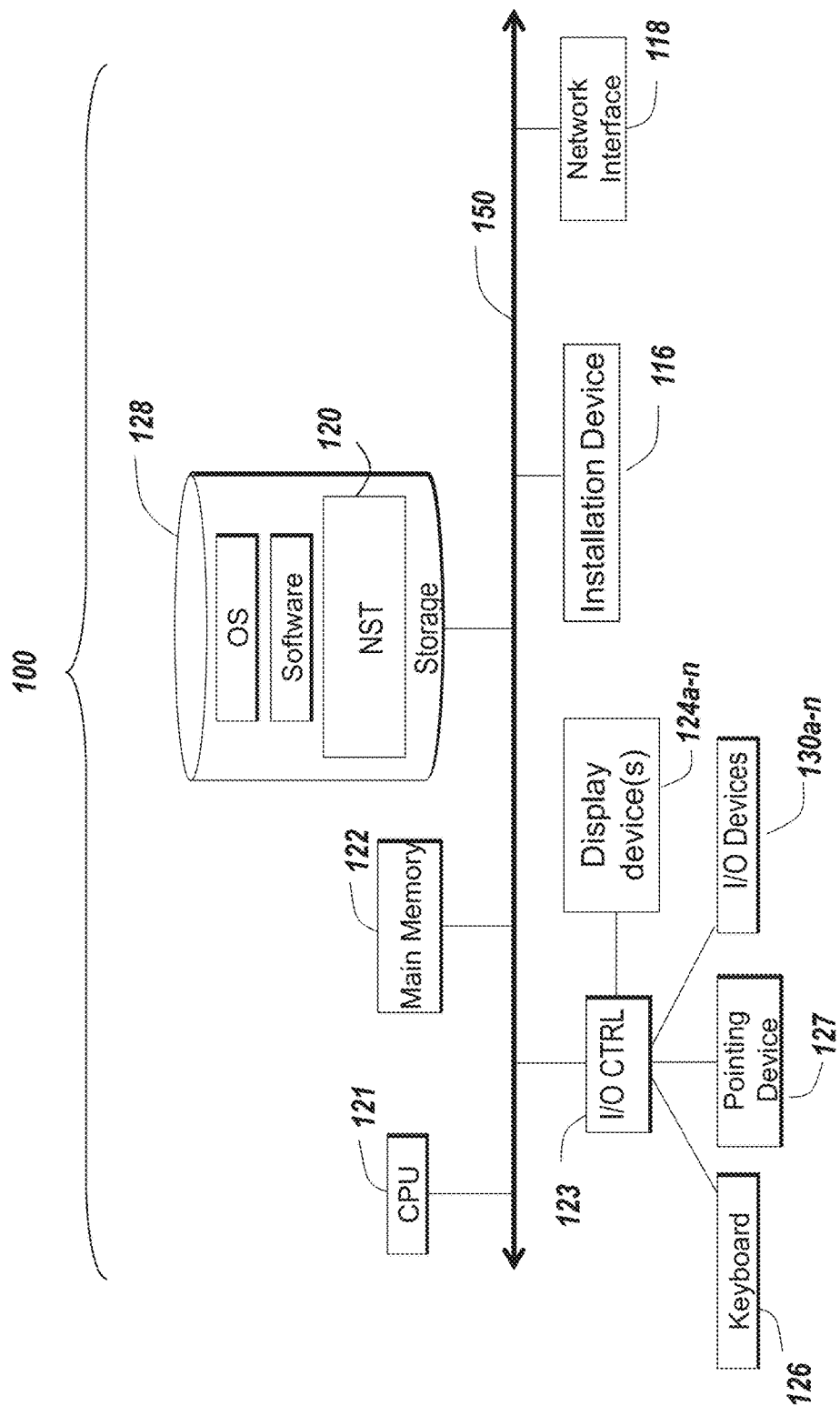
FIGS. 1C and 1D are block diagrams depicting embodiments of computing devices useful in connection with the methods and systems described herein.
Figure 1D:
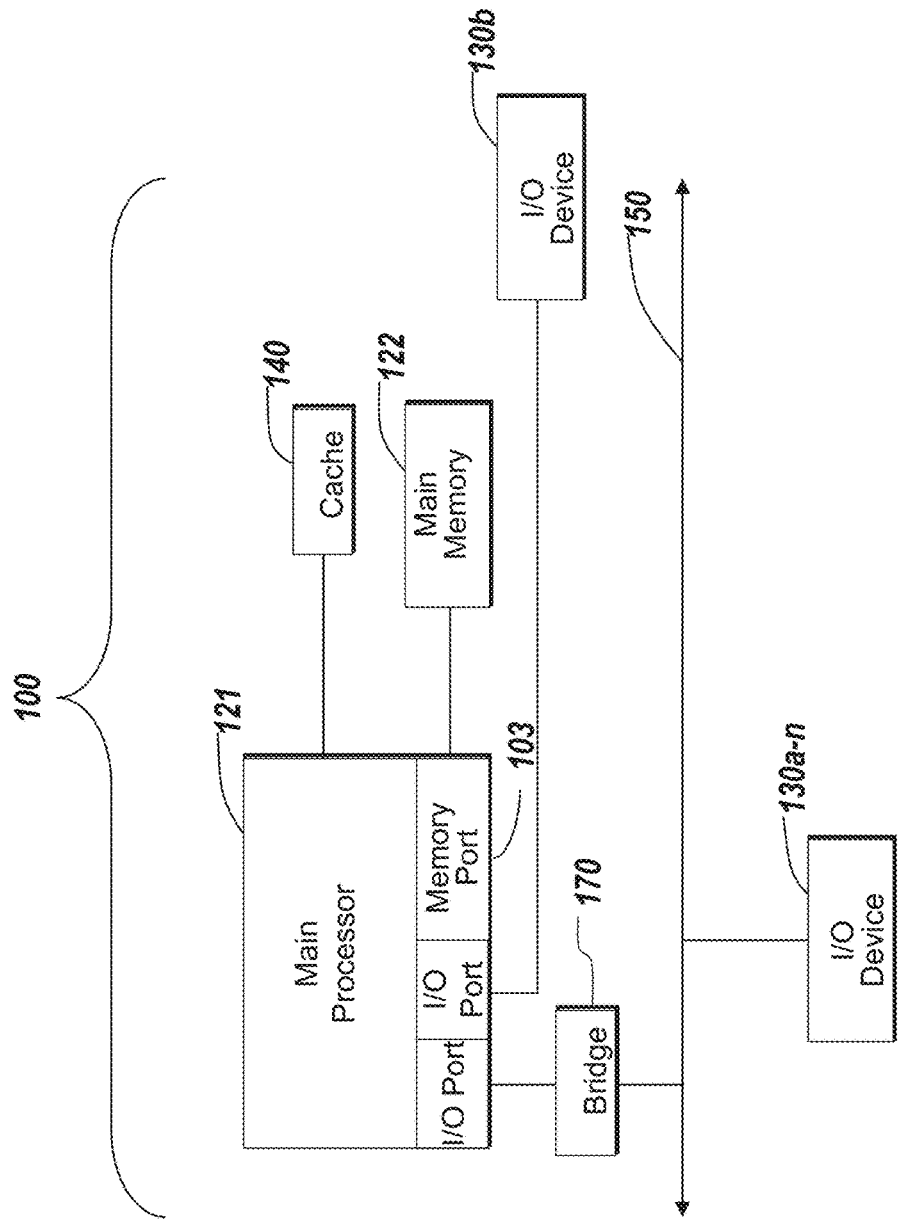

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 can include a storage device 128, an installation device 116, a network interface 118, an I/O controller 123, display devices 124a-124n, a keyboard 126 and a pointing device 127, e.g. a mouse. The storage device 128 can include, without limitation, an operating system, software, and a software of a network security monitor (NSM) 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor can include two or more processing units on a single computing component. Examples of multi-core processors include the AMD PHENOM IIX2, INTEL CORE i5 and INTEL CORE i7.

Main memory unit 122 can include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferro-electric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices can include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices can include video displays, graphical displays, speakers, headphones, inkjet printers, laser printers, and 3D printers.

Devices 130a-130n can include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies.

Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices can include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 can include or connect to multiple display devices 124a-124n, which each may be of the same or different type and/or form. As such, any of the I/O devices 130a-130n and/or the I/O controller 123 can include any type and/or form of suitable hardware, software, or combination of hardware and software to support, enable or provide for the connection and use of multiple display devices 124a-124n by the computing device 100. For example, the computing device 100 can include any type and/or form of video adapter, video card, driver, and/or library to interface, communicate, connect or otherwise use the display devices 124a-124n. In one embodiment, a video adapter can include multiple connectors to interface to multiple display devices 124a-124n. In other embodiments, the computing device 100 can include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120 for the network security monitor. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices can include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform can include a repository of applications on a server 106 or a cloud 108, which the clients 102a-102n may access over a network 104. An application distribution platform can include application developed and provided by various developers. A user of a client device 102 may select, purchase and/or download an application via the application distribution platform.

Furthermore, the computing device 100 can include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Network Security Monitor

The present disclosure relates generally to a network security monitor that performs cluster-based network threat detection. In network infrastructure that can include one or more distributed or centralized entities (e.g., network nodes, network elements, network components, or networked devices), it may be challenging to obtain or collect information from each of the network entities. It may be challenging to collect information (or the same information) from one or more network entities for various reasons, such as the network entity may be offline, damaged, busy processing other requests, improperly configured, or compromised. It may be challenging for the network security monitor to detect or determine threatful behavior corresponding to a network entity without collecting information from the network entity. Thus, it may be challenging to determine or detect threatful behavior with partial information from the network infrastructure.

Systems and methods of the present solution provide a network security monitor that can use partial information to detect upcoming threatful behaviors that can affect network infrastructure or network elements. The network security monitor can be configured with a dynamic clustering approach that facilitates extracting clusters from collected data. The network security monitor can combine the clusters with a pattern recognition technique, such as a k-Nearest Neighbors ("k-NN") technique to classify new upcoming behaviors.

The network security monitor can be configured to use, generate, or otherwise manipulate fuzzy logic, attributes, weights and clusters. For example, the network security monitor can use fuzzy logic when matching clusters or records. The network security monitor can also use fuzzy logic during the threat classification decision process.

The network security monitor can obtain or identify attributes. Attributes can refer to raw logs that are normalized and parsed. The network security monitor can extract attributes about several entities and aggregate the attributes about the several entities. The network security monitor can extract the aggregated attributes at a desired time. The network security monitor can use the aggregated attributes during the whole process. Aggregated attributes can include, for example, averages, sums, counts, unique counts and min/max values.

The network security monitor can generate or use weights. For example, the data collected and analyzed by the network security monitor can include many attributes. Some of these aggregated attributes may be more important (or influential) than others. This importance can be translated as the "weight" of the attribute (or variable). The network security monitor can take the weight into an account during the decision process.

The network security monitor 120 can transform the attributes. For example, the transformation can include standardizing or scaling the attributes and then multiplying the attributes by the weight assigned to the attribute. Thus, the behavior can refer to the collection of aggregated and non-aggregated attributes about an entity (e.g., IPs, domains, mails, devices, connections, etc.).

The network security monitor can generate or identify clusters. Clusters can refer to groups of records that are similar to each other. Each group can include records that are similar to each other. Each group can have a number of records. If the number of records in the group satisfies a threshold, then the group may be considered a threatful group or normal group. If the number of records is less than a threshold or minimum number of records, then the group can be considered an outlier (e.g., the records in the group can form a set of outliers).

The network security monitor can create the clusters using fixed cluster creation or dynamic cluster creation. In fixed cluster construction, the network security monitor identifies a priori the number of clusters to create. For example, an administrator or user of the network security monitor can provide or otherwise indicate the number of cluster to create. In dynamic cluster construction, the network security monitor can influence the number of clusters to create based on a set of parameters. The number of clusters can be determined based on the distribution of the attributes and the weights of the attributes. Determining the number of clusters based on the distribution and weights of the attributes can facilitate creating clusters as they are based on the density of the behaviors, as well as tuning cluster construction with a set of parameters or thresholds. For example, the network security monitor can determine an optimal or beneficial number of clusters to create based on the distributions of the attributes and the weights of the attributes.

The network security monitor can be configured with a k-Nearest Neighbors technique ("k-NN"). K-NN can refer to a non-parametric technique used for classification. In both dynamic cluster construction and fixed cluster creation, the input can include the k closest training examples in the feature space. The output can be a class membership. The network security monitor can classify an object by a majority vote of its neighbors, with the object being assigned to the class most common among its k nearest neighbors. In some cases, the value of k can be specified. In some cases, the network security monitor can dynamically assign the value of k.

The network security monitor can be configured with a matching process. In the matching process, the network security monitor can create the clusters, match records for the k-NN classification, and match records in the testing phase. The network security monitor can compares two or more records. Each record can include multiple columns or variables. Each variable can be associated with a weight. For example, if the variables are numeric then the result if the matching can be numeric in the interval [0 . . . 1]. If the variable is Boolean, then the result of the matching can be 1 if the two attributes identical and 0 if the two attributes are not identical to each other.

If the value of the attribute is non-numeric, then the network security monitor can match the attributes in a Boolean fashion. If the network security monitor determines that the non-numeric attributes match, the network security monitor can assign the value of 1. Otherwise, if the network security monitor determines that the non-numeric metrics do not match, then the network security monitor can assign attribute a value of 0.

For example, if the attributes are numeric the network security monitor can perform the following functions:

1. The network security monitor can expand the number representing the attribute within the cluster to a fuzzy term, as depicted in graph 300 in FIG. 3A.

2. The network security monitor can match the value of the testing record by performing a Fuzzification process, as depicted in graph 305 in FIG. 3B.

3. The result of the Fuzzification process depicted in FIG. 3B can be the matching result as it can represent the degree to which one number belongs to the fuzzy set created by the other number.

4. The network security monitor can add the results from all the matches performed on the attributes of the two records (one represents a record from the testing set, and the other represent some cluster), such that the final result R can be:

$$R = \frac{\sum r_i w_i}{\sum w_i} \quad \text{Equation 1}$$

Result "$R$" of the matching process.

In Equation 1, $r_i$ can be the matching result and $w_i$ can be the importance or weight of the attribute. Thus, the network security monitor can combine the Defuzzification process with the final result.

The network security monitor can determine how well the clusters recognize a set of a given data. To do so, the network security monitor can simulate the performance by creating the clusters with one set of data and test it with another. The learning data set and the testing data set can be different. For example, the learning data set can be randomly created. The network security monitor can maintain temporal order by selecting the learning data from a bin which is prior to the bin containing the testing data.

The network security monitor can create clusters by assigning records to clusters, updating the centers of the clusters, and then testing the cluster. For example, the network security monitor can select, choose, identify or otherwise obtain a record and assign (or temporarily assign or associate) the record to a first cluster (or default cluster or initial cluster). The network security monitor can then match the data in the record against the first cluster. If R, as described in Equation 1, satisfies (e.g., greater than or equal to) a threshold T, then the network security monitor can add the record to the cluster. If R does not satisfy (e.g., less than) the threshold then the network security monitor can create a second cluster and assign the new record as the center of the second cluster. The network security monitor can repeat the process until some or all the records are assigned to clusters. If the number of records in a certain cluster is less than threshold, the network security monitor can move the cluster to an outlier bin (or otherwise flag the cluster as an outlier).

The network security monitor can update centers of the clusters. After the network security monitor creates the clusters, the network security monitor can determine if the attribute is a non-numeric attribute or numeric attribute. If the attribute is non-numeric, then the network security monitor may not change the values of the center. If the attribute is numeric, then the network security monitor can determine the average of the values from all the records that are assigned to the cluster. Thus, the network security monitor can create a new cluster that is more representative of the set of records that are assigned to the cluster.

The network security monitor can test the cluster after the network security monitor updates the centers of the clusters. The network security monitor can test the clusters by repeating the matching process to determine that records did not move out of one cluster and into another cluster. By testing the clusters after updating the centers, the network security monitor can improve the stability of the cluster generation process. If the network security monitor determines a change, then the network security monitor can determine the value R using Equation 1, and then assign records to a corresponding cluster, and then update the center of the cluster.

The network security monitor can, therefore, create multiple clusters with similar records. Each cluster can be formed to be distinguishable or separate from another cluster. By providing improved separation between clusters, the network security monitor can facilitate the recognition process during the testing process.

During the testing procedure, the network security monitor can match a new incoming record with the set of clusters, or the centers of the clusters as follows:

1. The network security monitor can match the new incoming record against the center of the cluster.

2. If the network security monitor determines that the matching result R is greater than or equal to a threshold, then the network security monitor can proceed to step 5; otherwise, go to step 3.

3. If the network security monitor determines that the matching result is less than the threshold, try the next option in the list described below.

4. The network security monitor can go to step 1.

5. The network security monitor can extract the cluster that recognized the new record with the largest certainty.

6. The network security monitor can create a set of records that have the same IP/Group IP.

7. The network security monitor can count the number of threat records in the cluster and the number of normal records in the cluster. The network security monitor can determine the total number of records in the cluster.

8. The network security monitor can mark the cluster as a success if the ratio of the number of threats to the number of records is above a threshold, and if the record is a threat. Similarly, if the ratio of normal records to the number records is above a threshold, and the record is normal, then the clustering is marked as a success. Otherwise, the network security monitor can mark the clustering as a failure.

9. The network security monitor can retrieve the next record to be tested.

In some cases, the network security monitor can perform a classification process using a k-NN technique as follows:

1. The network security monitor can match a new incoming record against all other records.

2. If the network security monitor determines the matching result is above a given threshold, then the network security monitor can proceed to step 5; otherwise, the network security monitor can proceed to 3.

3. The network security monitor can determine that if the matching result is less than the threshold, then to try the next option in the list described below.

4. The network security monitor can go to 1.

5. The network security monitor can create a set of records that have the same IP/Group IP.

6. The network security monitor can count the number of threat records in the cluster and the number of normal records in the cluster. The network security monitor can count the total number of records in the cluster.

7. The network security monitor can determine the ratio of threat records to the number of total records. If the threat ratio is above a threshold, and the record is a threat, then the network security monitor can mark the clustering as a success. If the ratio of normal records to the number of total records is above a threshold and the record is normal, then the network security monitor can mark the clustering as a success. Otherwise, the network security monitor can mark the clustering as a failure.

8. The network security monitor can get the next record to be tested.

The network security monitor can be configured to use the clustering technique or classification techniques to detect threatful behavior in the network infrastructure in the following cases. The network security monitor can tune the system using the following cases to simulate the results in order to select the best one or more values to use for each case. For example, the network security monitor can use the following eight scenarios or cases to simulate the system to select the best values based on the results, thereby tuning the network security monitor.

1. The network security monitor can use the clustering algorithm to check if the incoming record IP is a threat.

2. The network security monitor can use the clustering algorithm to check if the incoming record IP is not a threat.

3. The network security monitor can using the clustering algorithm to check if the incoming record IP group is a threat.

4. The network security monitor can use the clustering algorithm to check if the incoming record IP group is not a threat.

5. The network security monitor can use the k-NN technique to check if the incoming record IP is a threat.

6. The network security monitor can use the k-NN technique to check if the incoming record IP is not a threat.

7. The network security monitor can using the k-NN technique to check if the incoming record IP group is a threat.

8. The network security monitor can use the k-NN technique to check if the incoming record IP group is not a threat.

Figure 4:
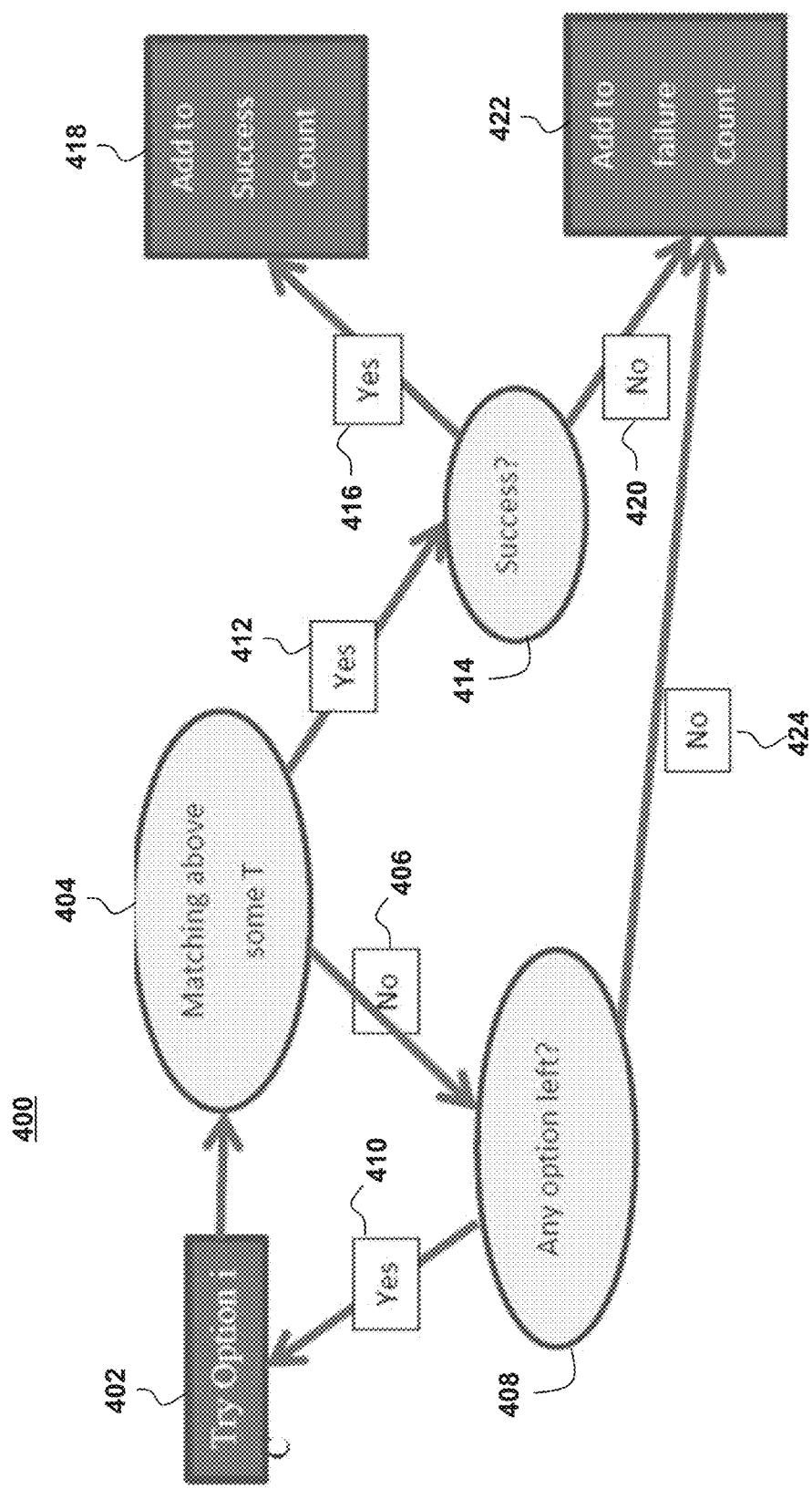
FIG. 4 is a flow diagram depicting an embodiment of a testing process.

If none of the above cases matched, the network security monitor can determine the record is an outlier or a new case, and flag the record accordingly, as depicted in FIG. 4.

The network security monitor can configured to perform a tuning process. In the tuning process, the network security monitor can learn how to identify or find the best values for the variables selected to be part of the system. For example, the learning or tuning process can facilitate determining the values for the variables chosen to be part of the system. The network security monitor can determine or learn which variables to use in identifying a threat, and the value to use for the selected variables.

To perform the tuning process, the network security monitor can choose the variables that can contribute to the identification of a threat. The network security monitor can select different types of variables, such as Boolean variables, linguistic variables, or numeric variables. Different types of variables can have different values. For example, some of the variables can be Boolean with values of 0 or 1. Some variables can be linguistic (e.g., include a finite non numeric values), so the system can check all possible values. Some variables can be numeric, so the network security monitor can select some representative values.

After the network security monitor examines all the variables, the network security monitor can create a multi-variable loop in order to check all possible values for all possible variables. This may generate a large number of possible solutions. Since some of the solutions may be irrelevant and some of the solutions may be highly relevant, the network security monitor can select the variables that provide the best results (e.g., high recall and precision) when matching a new record with the clustering system to find out if the new record is a threat or not.

After the network security monitor selects the best values to find the threats of an IP, the network security monitor can use these values to simulate the system multiple times (e.g., 25 times, 50 times, 75 times, 100 times, 150 times, 200 times or more) to determine a level of consistency in the results. If the network security monitor determines the results are not consistent (e.g., an amount of variability or variance from result-to-result that is greater than a tolerance threshold), the network security monitor can select the next best set of values. If the network security monitor determines the simulation is consistent and good (e.g., an amount of variability or variance from result-to-result that is less than a tolerance threshold), the network security monitor can save the set of values and proceed with tuning the next case (e.g., case #2—the network security monitor can use the clustering algorithm to check if the incoming record IP is not a threat). Thus, the by the end of the tuning process, the network security monitor can identify, generate or select eight different sets of values for eight different cases.

Figure 2:
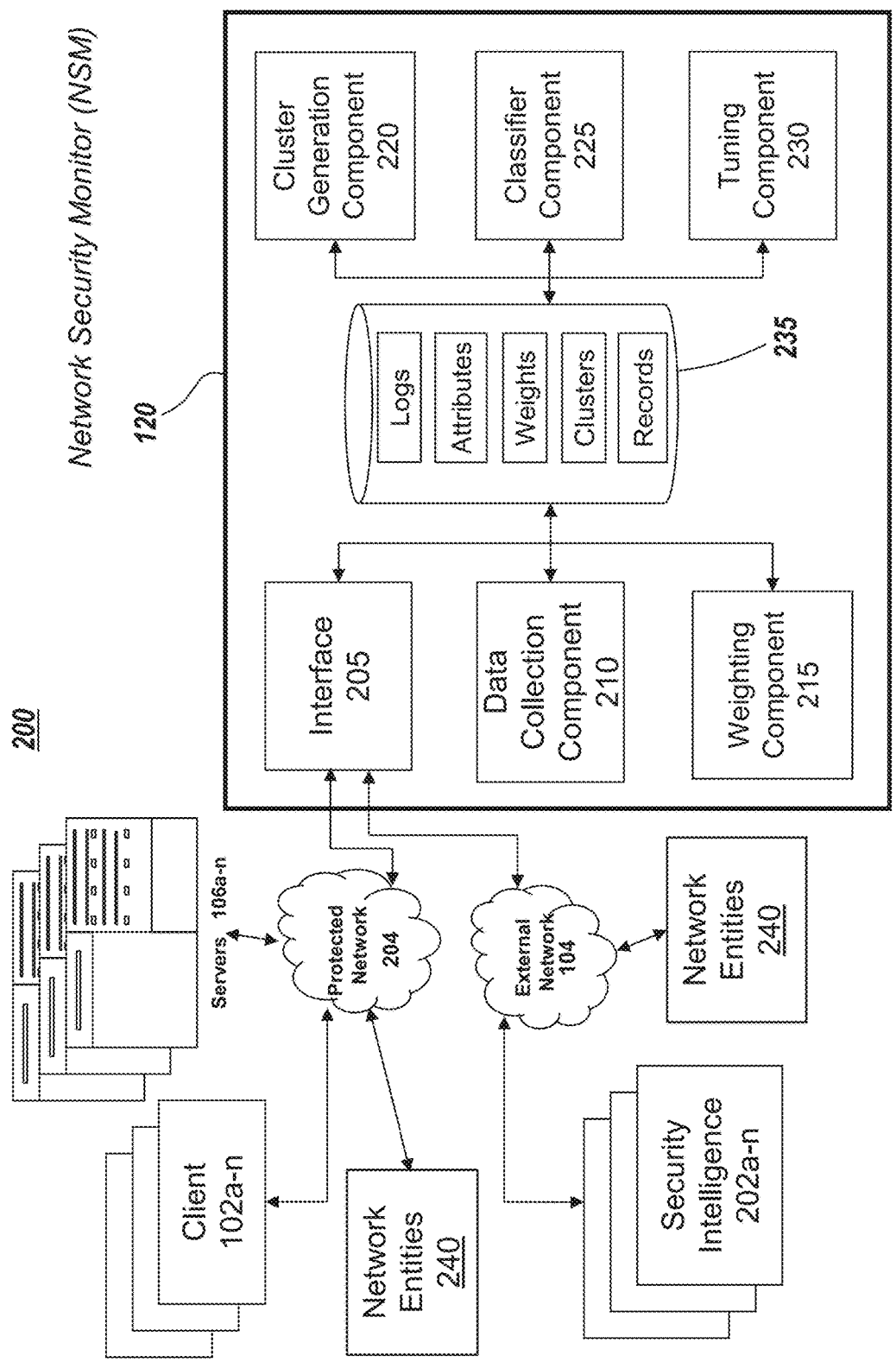
FIG. 2 is a block diagram depicting an embodiment of a system for detecting threats in a network.

Referring now to FIG. 2, a block diagram depicting an embodiment of a system 200 comprising a network security monitor is shown. In brief overview, the system 200 includes a network security monitor 120 ("NSM") that can receive and/or transmit data via a protected network 204 and/or an external network 104. The system can include one or more clients 102a-n and/or one or more servers 106a-n that access the protected network 204. The system can include or communicate with security intelligence repositories 202a-n, such as third-party threat intelligence providers, crowd sourced threat intelligence, etc. The network security monitor 120 can include an interface 205 that accesses the protected network 204 and external network 104. The interface 205 can also facilitate interactions or communication between one or more modules, engines, components or databases of the network security monitor 120. The network security monitor 120 can include, interface with, access or otherwise communicate with a data collection component 210 (or data collector) that obtains logs (e.g., status information) for network elements or entities 240 in the protected network 204 or the external network 104. The network security monitor 120 can include, interface with, access or otherwise communicate with a weighting component 215 (or weighter) that applies or assigns weights to attributes or variables of the data collected by the data collection component 210. The network security monitor 120 can include, interface with, access or otherwise communicate with a cluster generation component 220 (or cluster generator) that can generate groups of records that are closely similar to each other. The network security monitor 120 can include, interface with, access or otherwise communicate with a tuning component 230 (or tuner) that can perform a self-learning process to identify values for variables that improve the clustering and classification process. The network security monitor 120 can include, interface with, access or otherwise communicate with a classifier component 225 (or classifier) to classify a record or behavior as a threat or not a threat. The network security monitor 120 can include, interface with, access or otherwise communicate with a database or data repository 240 that stores, in or more data structures or data files, include logs, attributes, weights, clusters, and records. The network security monitor 120 can generate a report based on whether or not at threat is detected in the networks 204 or 104, and communicate the report to a client 102a-n via the network 204 or 104 or other entity. The network security monitor 120 can, responsive to detecting the threat, control a function of the affected network entity 240 or element. For example, the network security monitor 120 can, responsive to detecting the threat, disable the network entity 240 or element, restart the network entity 240 or element, reset the network entity 240 or element, repair the network entity 240 or element, patch or update the network entity 240 or element, or otherwise eliminate or remove the threat affecting the network entity 240 or element.

The network security monitor 120, interface 205, data collection component 210, weighting component 215, cluster generation component 220, tuning component 230, classifier component, and database 240 can each include one or more processing units or other logic devices such as programmable logic array engines, modules, or circuitry designed and constructed to facilitate managing security on a network infrastructure. The network entity 240 can include, for example, network nodes, network elements, network components, or networked devices. Network entities 240 can include, for example, a gateway, router, switch, firewall, server, file server, web server, host server, or other component or device that can access a network.

In further detail, the network security monitor 120 includes an interface 205. The interface 205 can be designed and constructed to access or communicate via a protected network 204 or an external network 104. A protected network 204 may refer to a private network, e.g., a network that the network security monitor 120 is attempting to monitor or protect. For example, this network may refer to an internal network, or intranet, of a company, organization, university, or other entity. The interface 205 may be designed and constructed to access or communicate via an external network 104, such as the World Wide Web or Internet. The interface 205 may facilitate interaction or communication between one or more modules or components of, or associated with, the tool 120, such as the data collection component 210, weighting component 215, cluster generation component 220, tuning component 230, classifier component 225, and database 240. The interface 205 may directly interface with the modules or networks 104 and 204, or the interface may communicate with the modules or networks via an intermediary device, application program interface, input/output device, etc.

The network security monitor 120 can include a data collection component 210 (or data collector) designed and constructed to obtain logs or records, aggregate records, or identify attributes or values of the records. The data collection component 210 can obtain a plurality of records for a plurality of network entities 240 that access protected network 204 or external network 104. The records can include attributes associated with the one or more network entities 240.

For example, the data collection component 210 can receive the logs via interface 205 or another interface of the data collection component 210. The data collection component 210 can receive the logs securely from the protected network 204 (e.g., an encrypted network, password protected network, access restricted network, time restricted network, etc.). The data collection component 210 may receive, request, retrieve or obtain logs from the protected network 204 that indicate a status of the protected network. The logs may indicate network activity on the protected network 204 including, e.g., threats, traffic, email, performance authentication, authorization and accounting (AAA), VPN, and access control information. Each log may have a log identifier and indicate information associated with the network activity such as device identifiers, time stamps, domains, level of severity of the log event, source port of the session, source internet protocol (IP) of the session, destination IP of the session, reference URL, etc. Tables 1-8 are an illustrative example of the type of information that can be obtained or determined by the data collection component 210 to provide the records or attributes or values.

The data collection component 210 can obtain the logs based on a time interval. In some embodiments, the data collection component 210 may continuously receive logs in real-time, e.g., as logs are created. In some embodiments, the data collection component 210 may receive the logs based on a time interval or in a batch process (e.g., multiple logs stored in one or more data files). For example, the data collection component 210 may receive logs hourly, every 12 hours, every 24 hours, weekly, every two weeks, or any other time interval set by an administrator of the network security monitor 120 that facilitates managing the security of the protected network 204. In some embodiments, the network security monitor 120, e.g., via the data collection component 210, may receive logs responsive to a request for logs.

The data collection component 210 may request logs from an agent executing on the protected network 204, such as a monitoring agent. A monitoring agent can execute on a server 106a-n of the protected network 204, or client 102a-n. The monitoring agent can include, for example, an antivirus tool, a network security element, an intrusion prevention system, or an intrusion detection system. In some embodiments, the data collection component 210 may obtain network information or logs from a vulnerability assessment tool (e.g., Open Vulnerability Assessment System ("OpenVAS"), which can include a framework of several services and tools offering a vulnerability scanning and vulnerability management solution. The monitoring agent may create one or more types of logs including, e.g., general system logs, network security logs, intrusion prevention system logs, intrusion detection system logs, or an antivirus application log.

The logs received by the data collection component 210 may be in any format that provides information on network activity of the protected network 204. In some embodiments log files can include plain text files, comma-delimited files, binary files, spreadsheets, etc. For example, a text file may be comma-delimited to reflect headers for each column in the log file. In some embodiments, depending on the monitoring agent, the monitoring agent may create a log folder that contains a series of logs files, one file for each day of log entries. The log files may be named MMDDYYYY.log, where MMDDYYYY indicates the date of the log entries.

In some embodiments, the monitoring agent may store log files in a predetermined directory of a server or client of the protected network. The data collection component 210 may access the predetermined directory based on a time interval (e.g., periodically, upon request, or some other time interval) to determine whether there are new or updated logs that can be retrieved. In some embodiments, the data collection component 210 may retrieve or receive the logs, and store the logs in database 240. The data collection component 210 may store all previous logs, aggregate logs based on type, or delete the logs after a time period (e.g., 24 hours, 48 hours, a week, month, year, etc.).

The network security monitor can normalize or organize the logs obtained by the data collection component 210. The logs can include different types of logs generated by the protected including, but not limited to, general system logs, network security logs such as those generated by IPSs and IDSs, and logs generated by anti-virus applications. The data collection component 210 can organize the logs in a manner that facilitates comparing the logs to extensive lists of threat indicators in order to determine whether or not the protected network is currently infected by an APT. By indexing the logs provided to the network security monitor, the network security monitor 120 can achieve greater efficiency by comparing logs to the appropriate lists of potential threat indicators, thereby reducing the amount of computing resources consumed by the network security monitor during operation.

The data collection component 210 can index the logs based on threat indicators. The data collection component 210 can be configured with a log normalizations schema that allows the data collection component 210 to organize different types of logs obtained from different types of devices, collectors, tools, applications, or monitoring agents. Since each monitoring agent may use a different type of log representation, indexing all the received logs using a common log format or schema can improve the efficiency of the log correlation.

The data collection component 210 can parse, analyze, or otherwise process received logs to determine a type of log (e.g., threat log, email log, traffic log, authentication log, etc.), and one or more parameters or fields associated with the log. The data collection component 210 can then index the log based on the type of log (e.g., threat log), and organize the data or parameters associated with the log using a log format or schema. The data collection component 210 may index historical logs that were not previously indexed, as well as new logs received by the data collection component 210. The data collection component 210 may index logs in real-time as they arrive, or the data collection component 210 may index logs in a batch process run based on a time interval (e.g., hourly, daily, weekly, or some other time period that facilitates managing security of the network).

The following tables 1-8 illustrate embodiments of a log format or schema used by the data collection component 210 to organize, index, or normalize the logs received by the data collection component 210 or stored in the database 240. The data collection component 210 may use different formats or schema based on the type of log. The data collection component 210 may apply this format or schema for all received logs corresponding to the same type. For example, table 1 illustrates an embodiment of a log format or schema for mapping received logs to indexed threat logs; table 2 illustrates an embodiment of a log format or schema for mapping received logs to indexed traffic logs; table 3 illustrates an embodiment of a log format or schema for mapping received logs to indexed email logs; table 4 illustrates an embodiment of a log format or schema for mapping received logs to indexed performance logs; table 5 illustrates an embodiment of a log format or schema for mapping received logs to indexed AAA (authentication, authorization and accounting) logs; table 6 illustrates an embodiment of a log format or schema for mapping received logs to indexed VPN logs; table 7 illustrates an embodiment of a log format or schema for mapping received logs to indexed access control logs; table 8 illustrates an embodiment of a log format or schema for that are used for mapping one or more types of logs.

TABLE 1

Threat Log Mapping

| Field Name | Field Description |
|---|---|
| @timestamp | Time stamp of the event |
| Devname | ID of the device |
| Devid | Name of the device |
| Domain | Name of the virtual device |
| Logid | ID of the event |
| Type (threat) | Type of the event |
| Subtype (anomaly, virus, signature) | Subtype of the event |
| level | Severity of the event |
| srcport | Source port of the session |
| srcip | Source IP of the session |
| srcintf | Source interface of the session |
| dstintf | Destination interface of the session |
| dstip | Destination IP of the session |
| dstport | Destination port of the session |
| service | Service of the session |
| sessionid | Session ID |
| policyid | Identification number of the policy |
| identidx | Authentication policy ID |
| user | Identified user of the session |
| group | Identified user's group of the session |

TABLE 1-continued

Threat Log Mapping

| Field Name | Field Description |
|---|---|
| profile | Security profile that recognizes the threat |
| proto | |
| Status (blocked, passthrough, monitored, analytics, detected, dropped, reset) | Action performed for the current threat |
| attackname | Name of the threat |
| ref | Reference URL |
| file | Name of the file infected |
| checksum | Checksum of the file infected |
| quarskip | Quarantine action |
| url | Source URL of the threat (malware) |
| from | Sender's email address in case of threat through email |
| to | Recipient's email address in case of threat through email |
| severity | Severity of the threat |
| count | Number of packets |
| attackid | Identification of the threat |
| incidentserialno | Incident serial number |

TABLE 2

Traffic log mapping

| Field Name | Field Description |
|---|---|
| @timestamp | Timestamp of the event |
| Devname | Name of the system |
| Devid | Unique identification number of the system |
| Logid | Log, identification number |
| Type | Type of the event value: traffic |
| Subtype | Subtype of the event |
| Domain | Virtual domain of the system |
| Level | Severity of the event |
| Srcport | Source port of the session |
| Srcip | Source IP of the session |
| Srcintf | Source interface of the session |
| Dstintf | Destination interface of the session |
| Dstip | Destination IP of the session |
| Dstport | Destination port of the session |
| Srccountry | Source country |
| Dstcountry | Destination country |
| Policyid | Identification number of the security policy traffic passthrough |
| Identidx | Identify-based policy identification number |
| Sessionid | Serial number of the session |
| Service | Service of the session |
| User | Identified user of the session |
| group | Identified user's group of the session |
| applist | Application sensor that recognizes the application |
| status | Status of the traffic session |
| appid | Identification number of the application |
| app | Name of the application |
| appcat | Category of the application |
| duration | Duration of session in seconds |
| sentbyte | Number of sent bytes |
| rcvdbyte | Number of received bytes |
| totalbytes | Total bytes |
| sentpkt | Number of sent packets |
| rcvdpkt | Number of received packets |
| trandisp | Type of NAT |
| tranip | Translated IP in NAT mode |
| transip | Translated source IP in NAT mode |
| tranport | Translated port |
| transport | Translated source port |
| proto | IP protocol |

TABLE 3

Email log mapping

| Field Name | Field Description |
|---|---|
| @timestamp | Timestamp of event |
| Devid | ID of the device |
| Devname | Name of the device |
| Domain | Name of the virtual device |
| Logid | ID of the event |
| Type (email) | Type of the event |
| Subtype (spam regular) | Subtype of the event |
| level | Severity of the event |
| srcport | Source port of the session |
| Srcport | Source port of the session |
| Srcip | Source IP of the session |
| Srcintf | Source interface of the session |
| Dstintf | Destination interface of the session |
| Dstip | Destination IP of the session |
| Dstport | Destination port of the session |
| service | Service of the session |
| sessionid | ID of the session |
| policyid | ID of the policy |
| identidx | ID of the identification policy |
| user | Name of the user |
| group | Name of the group to which user belongs |
| profile | Name of the security profile |
| Status (detected, blocked, exempted) | Status of the action taken |
| from | Sender of the email |
| to | Recipient of the email |
| msg | Information related to the spam mechanism |
| subject | Subject of the email |
| size | Size of the email |
| cc | CC of the email |
| Attachment (yes, no) | Whether the email includes an attachment |

TABLE 4

Performance log mapping

| Field Name | Field Description |
|---|---|
| @timestamp | Timestamp of event |
| Devid | ID of the device |
| Devname | Name of the device |
| Domain | Name of the virtual device |
| Logid | ID of the event |
| Type (perf) | Type of the event |
| Subtype sys | Subtype of the event |
| cpu | Percentage of CPU usage |
| mem | Percentage of memory usage |
| totalsession | Total number of system's sessions |

TABLE 5

AAA (authentication, authorization and accounting) log mapping

| Field Name | Field Description |
|---|---|
| @timestamp | Timestamp of the event |
| Devname | Unique identification number of the system |
| Devid | Log identification number |
| Logid | Type of the event (value: traffic) |
| Type (aaa) | Subtype of the event |
| Subtype (authen, author, acc) | Virtual domain of the system |
| domain | Virtual domain of the system |
| level | Severity of the event |
| Scope (local, ssl-web) | Authentication scope |
| Action (login, logout) | Action |
| srcport | Source port of the session |
| dstport | Destination port |
| srcip | Source IP |
| Status (success, failed) | Whether the AAA succeeded or failed |
| profile | User profile |

TABLE 5-continued

AAA (authentication, authorization and accounting) log mapping

| Field Name | Field Description |
|---|---|
| duration | Duration |
| reason | Reason for failure |
| user | User |
| group | Group |
| tunnelid | Identification of the tunnel. |

TABLE 6

VPN log mapping

| Field Name | Field Description |
|---|---|
| @timestamp | Timestamp of the event |
| @id | Identification of the event |
| logid | Log identification number |
| Level | Severity of the event |
| Type (vpn) | Type of the event (value: traffic) |
| Subtype (ssl, ipsec) | Subtype of the event |
| devid | Unique identification number of the system |
| devname | Name of the system |
| vdev | Virtual domain of the system |
| tunnelid | Tunnel ID |
| remoteip | Remote IP |
| tunnelip | Tunnel IP |
| Status (up, down) | |
| user | User |
| group | Group |
| sentybte | Sent byte |
| rcvdbyte | Receive byte |
| duration | Duration |
| reason | Reason |
| tunneltype | Tunnel type |

TABLE 7

Access Control log mapping

| Field Name | Field Description |
|---|---|
| @timestamp | Timestamp of the event |
| devname | ID of the device |
| devid | Name of the device |
| domain | Name of the virtual device |
| logid | ID of the event |
| Type (acc.ctrl) | Type of the event |
| Subtype (app web) | Subtype of the event |
| level | Severity of the event |
| srcport | Source port of the session |
| srcip | Source IP of the session |
| Srcintf | Source interface of the session |
| Dstintf | Destination interface of the session |
| Dstip | Destination IP of the session |
| Dstport | Destination port of the session |
| Service | Service of the session |
| Sessionid | ID of the session |
| Policyid | ID of the security policy |
| Identidx | ID of the identification policy |
| User | Identified user of the session |
| Group | Identified user's group of the session |
| profile | Security profile that catches the application |
| proto | Protocol number in IPv4 packets |
| Status (pass, block, reset, reject, passthrough, monitor) | Status of the action taken |
| app | Application name |
| appid | Application ID |
| count | Number of packets |
| hostname | Hostname of the destination |
| url | URL of the destination |
| Reqtype (direct, referral) | HTTP request type |
| method | Method use |

TABLE 7-continued

Access Control log mapping

| Field Name | Field Description |
|---|---|
| sentbyte | Sent bytes |
| revdbyte | Received bytes |
| cat | Category of the application0 |
| catdesc | Description of the category |

TABLE 8

Accumulated Standard fields mapping

| Category | Field Description |
|---|---|
| Standard fields (always present) | @timestamp<br>@id<br>@srcevent<br>Devid<br>Logid<br>Type<br>Subtype<br>Level |

In some embodiments, an exploit refers to a piece of software, a chunk of data, or a sequence of commands that takes advantage of a bug or vulnerability in order to cause computer software and/or hardware to have unintended or unanticipated behavior. Such behavior may aim to gain control of a system, allowing privilege escalation, or a denial-of-service attack. Signatures can refer to attack patterns that are used by the tool. The signatures, or patterns, specify attacks in a network, a network node, a networked device, at a host level. The network security monitor 120 can aggregate and store the threat intelligence in a database infrastructure 240 (e.g., file server, file system) using a threat intelligence schema/format for organizing and making the aggregated threat intelligence manageable and maintainable.

The network security monitor 120 can organize, normalize, process, transform, or otherwise analyze the threat intelligence obtained by the cluster generation component 220 (or stored in database 240) to generate a list of threat indicators. In some embodiments, normalizing the threat intelligence data can include de-duplicating redundant data and/or transforming the threat intelligence data into a structured list of threat indicators corresponding to a threat scheme (or log format schema). The network security monitor 120 can generate the list of threat indicators based on a schema for threats (e.g., threat schema or threat intelligence schema). The schema used by the network security monitor 120 organizes the aggregated threat intelligence and makes the threat intelligence database manageable and maintainable. The threat intelligence schema/format can be applied to threat indicators aggregated from different private and open source threat intelligence repositories including, (e.g., Internet Protocol address, a malware code sample, a malicious code sample, or an intrusion prevention system signature) to be structured and expressed as a list of threat indicators to allow the log correlation to identify a threat.

The network security monitor 120 can include a weight component 215 (or weighter) designed and constructed to assign, generate or apply weights to important attributes or values of the data collected and aggregated by the data collection component 210. For example, the data collected and analyzed by the network security monitor can include many attributes. Some of these aggregated attributes may be more important (or influential) than others. This importance can be translated as the "weight" of the attribute (or variable). The network security monitor 120 (e.g., via weighting component 215) can assign weights to the attributes to indicate the importance of the attribute.

The weighting component 215 can use various weighting techniques to determine the importance of a value or attribute and apply a corresponding weight. In some cases, the database 235 can store a weight data structure storing weights for one or more attributes. The weights can be predetermined. In some cases, the weights can be determined using a machine learning technique, such as a logistic regression technique that can generate or output weights that indicate a correlation between attributes and a threat or non-threat. For example, the machine learning technique can receive, as input, training data to output weights that can be applied during the network security monitor's 120 decision process. The weights can include numerical weights. The weights can range from 0 to 1, 0 to 10, 0 to 100, or any other numerical range that can indicate an importance of a value or attribute.

The network security monitor can include a cluster generation component 220 (or cluster generator). The cluster generation component 220 can generate a plurality of clusters from the plurality of records using a matching process. The cluster generation component 220 can generate the plurality of clusters using the weighted logs, attributes or records.

For example, the cluster generation component 220 can generate or identify clusters and assign records to the identified clusters. Clusters can refer to groups of records that are similar to each other. Each group can include records that are similar to each other. Each group can have a number of records. If the number of records in the group satisfies a threshold, then the group may be considered a standard group or normal group. If the number of records is less than a threshold or minimum number of records, then the group can be considered an outlier (e.g., the records in the group can form a set of outliers).

The records can indicate behavior of a network node or network element, such as the number of network connections at a node, which countries the connections are with, how many ports are being used, how a node has been communicating with other nodes, etc.

The cluster generation component 220 can create the clusters using a fixed cluster creation technique or a variable cluster creation technique. In fixed cluster construction, the cluster generation component 220 can identify a priori the number of clusters to create. For example, an administrator or user of the network security monitor 120 can provide or otherwise indicate the number of cluster to create. The number of clusters to create can be stored in database 235. In variable cluster construction, the cluster generation component 220 can determine the number of clusters to create based on a set of parameters. For example, the network security monitor can determine an optimal or beneficial number of clusters to create. The optimal or beneficial number of clusters to create can be based on the types of records identified, the desired amount of cluster separation, or resource availability (e.g., processing capacity, memory availability, bandwidth usage). In some cases, the network security monitor 120 can apply a machine learning technique or tuning technique to determine the optimal number of clusters to create.

To create the clusters of records, the cluster generation component 220 performs a matching process. This matching process can be utilized by the classifier component 225 (e.g., during k-NN classification) or the tuning component 230 (e.g., during the testing phase). In the matching process, the cluster generation component 220 (or classifier component 225 or tuning component 230) can compare records with each other. The cluster generation component 220 can compare two or more records. Each record can include multiple columns or variables. Each variable can be associated with a weight. For example, if the variables are numeric then the result if the matching can be numeric in the interval [0 . . . 1]. If the variable is Boolean, then the result of the matching can be 1 if the two attributes identical and 0 if the two attributes are not identical to each other.

If the value of the attribute is non-numeric, then the cluster generation component 220 can match the attributes in a Boolean fashion. If the network security monitor determines that the non-numeric attributes match, the network security monitor can assign the value of 1. Otherwise, if the network security monitor determines that the non-numeric metrics do not match, then the network security monitor can assign attribute a value of 0.

Figure 3A:
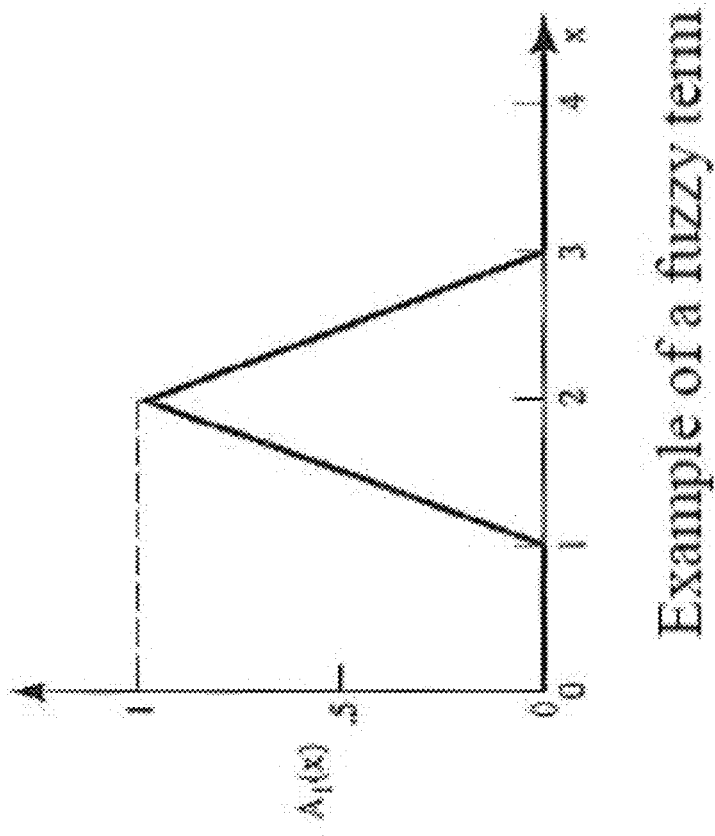
FIGS. 3A and 3B are diagrams depicting fuzzy logic in accordance with an embodiment.
Figure 3B:
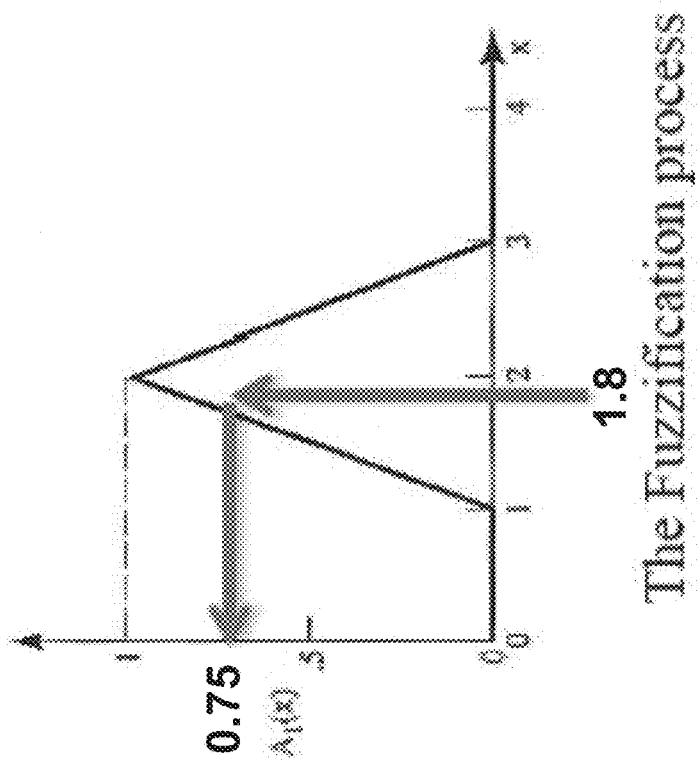

For example, if the attributes are numeric the network security monitor can perform the following functions:

1. The cluster generation component 220 can expand the number representing the attribute within the cluster to a fuzzy term, as depicted in FIG. 3A.
2. The cluster generation component 220 can match the value of the testing record by performing a Fuzzification process, as depicted in FIG. 3B.
3. The result of the Fuzzification process depicted in FIG. 3B can be the matching result as it can represent the degree to which one number belongs to the fuzzy set created by the other number.
4. The cluster generation component 220 can add the results from all the matches performed on the attributes of the two records (one represents a record from the testing set, and the other represent some cluster), such that the final result R can be:

$$R = \frac{\sum r_i w_i}{\sum w_i} \qquad \text{Equation 1}$$

Result "R" of the matching process.

In Equation 1, $r_i$ can be the matching result and $w_i$ can be the importance or weight of the attribute. Thus, the network security monitor can combine the Defuzzification process with the final result.

Fuzzy logic can refer to an approach to computing based on degrees of truth. In fuzzy logic, the truth values of variables may be any real number between 0 and 1, considered to be "fuzzy". As depicted in FIG. 3A, the terms on the x-axis are input to the fuzzy logic equation $A_i(x)$ to generate a fuzzy term on the y-axis that ranges between 0 and 1. For example, as depicted in FIG. 3B, the fuzzification process can translate or transform the term 1.8 to a value of 0.75.

The cluster generation component 220 can determine how well the clusters recognize a set of a given data. The cluster generation component 220 can simulate the performance by creating the clusters with one set of data and test it with another. The learning data set and the testing data set can be different. For example, the learning data set can be randomly created. The network security monitor can maintain temporal order by selecting the learning data from a bin which is prior to the bin containing the testing data.

The cluster generation component 220 can create clusters by assigning records to clusters, updating the centers of the clusters, and then testing the cluster. For example, the cluster generation component 220 can select, choose, identify or otherwise obtain a record and assign (or temporarily assign or associate) the record to a first cluster (or default cluster or initial cluster). The cluster generation component 220 can then match the data in the record against the first cluster. If R, as described in Equation 1, satisfies (e.g., greater than or equal to) a threshold T, then the network security monitor can add the record to the cluster. If R does not satisfy (e.g., less than) the threshold then the network security monitor can create a second cluster and assign the new record as the center of the second cluster. The network security monitor can repeat the process until some or all the records are assigned to clusters. If the number of records in a certain cluster is less than threshold, the cluster generation component 220 can move the cluster to an outlier bin (or otherwise flag the cluster as an outlier).

The cluster generation component 220 can update centers of the clusters. After the cluster generation component 220 creates the clusters, the cluster generation component 220 can determine if the attribute is a non-numeric attribute or numeric attribute. If the attribute is non-numeric, then the cluster generation component 220 may not change the values of the center. If the attribute is numeric, then the network security monitor can determine the average of the values from all the records that are assigned to the cluster. Thus, the cluster generation component 220 can create a new cluster that is more representative of the set of records that are assigned to the cluster.

The cluster generation component 220 can test the cluster after the network security monitor updates the centers of the clusters. The cluster generation component 220 can test the clusters by repeating the matching process to determine whether records move out of one cluster and into another cluster. By testing the clusters after updating the centers, the cluster generation component 220 can improve the stability of the cluster generation process. If the network security monitor determines a change, then the network security monitor can determine the value R using Equation 1, and then assign records to a corresponding cluster, and then update the center of the cluster.

The cluster generation component 220 can be configured to perform the following testing procedure to match new incoming records with the set of clusters, or the centers of the clusters:

1. The cluster generation component 220 can match the new incoming record against the center of the cluster (e.g., step 404 in FIG. 4).

2. If the cluster generation component 220 determines that the matching result R is greater than or equal to a threshold, then the network security monitor can proceed to step 5 (e.g., step 414 in FIG. 4); otherwise, go to step 3 (e.g., step 408 in FIG. 4).

3. If the cluster generation component 220 determines that the matching result is less than the threshold, try the next option in the list described below as depicted in step 404 in FIG. 4.

4. The cluster generation component 220 can go to step 1 (e.g., step 404 in FIG. 4).

5. The cluster generation component 220 can extract the cluster that recognized the new record with the largest certainty.

6. The cluster generation component 220 can create a set of records that have the same IP/Group IP.

7. The cluster generation component 220 can count the number of threat records in the cluster and the number of normal records in the cluster. The network security monitor can determine the total number of records in the cluster.

8. The cluster generation component 220 can mark the cluster as a success if the ratio of the number of threats to the number of records is above a threshold, and if the record is a threat. Similarly, if the ratio of normal records to the number records is above a threshold, and the record is normal, then the clustering is marked as a success. Otherwise, the network security monitor can mark the clustering as a failure.

9. The cluster generation component 220 can retrieve the next record to be tested.

The cluster generation component 220 can, therefore, create multiple clusters with similar records. Each cluster can be formed to be distinguishable or separate from another cluster. By providing improved separation between clusters, the network security monitor can facilitate the recognition process during the testing process. The cluster generation component 220 can store the clusters in database 235.

The network security monitor 120 can include a classifier component 225 (or classifier) designed and constructed to classify records. The classifier component 225 can be configured with, or to perform, a pattern recognition technique. The classifier component 225 can classify a cluster (e.g., a first cluster) of the clusters as a threat cluster.

For example, the classifier component can be configured with a k-Nearest Neighbors technique ("k-NN"). K-NN can refer to a non-parametric technique used for classification. In both variable cluster construction and fixed cluster creation, the input can include the k closest training examples in the feature space. The output can be a class membership. The classifier component 225 can classify an object by a majority vote of its neighbors, with the object being assigned to the class most common among its k nearest neighbors. In some cases, the value of k can be specified. In some cases, the classifier component 225 can dynamically assign the value of k.

The classifier component 225 can perform instance-based learning where the function is approximated locally and the computation is deferred until classification. The classifier component 225 can assign weights to the contributions of the neighbors, so that the nearer neighbors contribute more to the average than the more distant neighbors. For example, the classifier component 225 can assign each neighbor a weight of 1/d, where d is the distance to the neighbor. The neighbors can be taken from a set of objects for which the class (for k-NN classification) is known.

In some cases, the classifier component 225 can test the k-NN classifier by matching new incoming records with the set of clusters (or centers) defined or established by the cluster generation component 220 as follows:

1. The network security monitor 120 can match a new incoming record against all other records.

2. If the network security monitor 120 determines the matching result is above a given threshold, then the network security monitor can proceed to step 5; otherwise, the network security monitor can proceed to 3.

3. The network security monitor 120 can determine that if the matching result is less than the threshold, then to try the next option in the list described below.

4. The network security monitor can go to 1.

5. The network security monitor 120 can create a set of records that have the same IP/Group IP.

6. The network security monitor 120 can count the number of threat records in the cluster and the number of normal records in the cluster. The network security monitor can count the total number of records in the cluster.

7. The network security monitor 120 can determine the ratio of threat records to the number of total records. If the threat ratio is above a threshold, and the record is a threat, then the network security monitor can mark the clustering as a success. If the ratio of normal records to the number of total records is above a threshold and the record is normal, then the network security monitor can mark the clustering as a success. Otherwise, the network security monitor can mark the clustering as a failure.

8. The network security monitor 120 can get the next record to be tested.

Thus, the network security monitor 120 can be configured to use the clustering technique or the classification techniques to test the following eight scenarios as depicted in FIG. 4:

1. The network security monitor can use the clustering algorithm to check if the incoming record IP is a threat.

2. The network security monitor can use the clustering algorithm to check if the incoming record IP is not a threat.

3. The network security monitor can using the clustering algorithm to check if the incoming record IP group is a threat.

4. The network security monitor can use the clustering algorithm to check if the incoming record IP group is not a threat.

5. The network security monitor can use the k-NN technique to check if the incoming record IP is a threat.

6. The network security monitor can use the k-NN technique to check if the incoming record IP is not a threat.

7. The network security monitor can using the k-NN technique to check if the incoming record IP group is a threat.

8. The network security monitor can use the k-NN technique to check if the incoming record IP group is not a threat.

If none of the above cases matched, the network security monitor can determine the record is an outlier or a new case, and flag the record accordingly.

The network security monitor 120 can receive, subsequent to generating the clusters, a record from a network entity 240 (or entity) that communicates via the network 204 or network 104. The network security monitor 120 can assign the record from the network entity 240 to the first clusters using the matching process. The network security monitor 120 can detect, responsive to assigning the record to the first cluster, a threat associated with the network entity 240 or network 104 or network 204.

As illustrated in FIG. 4, the testing process 400 can include trying one of the eight options at step 402. The network security monitor 120 can start with the first option, for example, which can be the case where the network security monitor 120 uses the clustering algorithm to check if the incoming record IP is a threat. At step 404, the network security monitor 120 can use the matching process to determine if the matching result R (e.g., determined using Equation 1) is above a threshold T. If the network security monitor 120 determines at step 404 that the matching result R is above the threshold T, then the network security monitor 120 can proceed via 412 to determine whether the record was successfully classified as a threat at step 414. If, however, the network security monitor 120 determines that the matching result R is less than the threshold, then the network security monitor can determine whether there are any other options left at step 408 via 406, and, if yes (410), try the next option at 402.

At step 414, the network security monitor 120 can extract the cluster that recognized the new record with the largest certainty. The network security monitor 120 can create a set of records that have the same IP/Group IP. The network security monitor 120 can count the number of threat records in the cluster and the number of normal records in the cluster. The network security monitor 120 can determine the total number of records in the cluster. The network security monitor 120 can mark the cluster as a success if the ratio of the number of threats to the number of records is above a threshold, and if the record is a threat (e.g., at step 418 via 416). Similarly, if the ratio of normal records to the number records is above a threshold, and the record is normal, then the clustering is marked as a success (e.g., step 418 via 416). However, if the record is not a threat but is placed in the threat cluster, then the network security monitor can mark the clustering as a failure at step 422 via 420. The network security monitor 120 can proceed with trying the next option at 402 if it is determined that there are options left at step 408.

The network security monitor 120 can include a tuning component 230 designed and constructed to perform a learning process that identifies values for variables selected to be part of the network security monitor 120 system. In the tuning process, the tuning component 230 can learn how to identify or find the best values for the variables selected to be part of the system. For example, the learning or tuning process can facilitate determining the values for the variables chosen to be part of the system. The tuning component 230 can determine or learn which variables to use in identifying a threat, and the value to use for the selected variables.

To perform the tuning process, the tuning component 230 can select the variables that can contribute to the identification of a threat. The tuning component 230 can identify a default set of variables, a predetermined set of initial variables to test, or identify a correlation between variables and threats. The tuning component 230 can select different types of variables, such as Boolean variables, linguistic variables, or numeric variables. Different types of variables can have different values. For example, some of the variables can be Boolean with values of 0 or 1. Some variables can be linguistic (e.g., include a finite non numeric values), so the system can check all possible values. Some variables can be numeric, so the network security monitor can select some representative values.

After tuning component 230 examines all the variables, the network security monitor can create a multivariable loop in order to check all possible values for all possible variables. This may generate a large number of possible solutions. Since some of the solutions may be irrelevant and some of the solutions may be highly relevant, the network security monitor can select the variables that provide the best results (e.g., high recall and precision) when matching a new record with the clustering system to find out if the new record is a threat or not.

After the network security monitor selects the best values to find the threats of an IP, the network security monitor can use these values to simulate the system multiple times (e.g., 25 times, 50 times, 75 times, 100 times, 150 times, 200 times or more) to determine a level of consistency in the results (e.g., matching result R using equation 1). If the network security monitor determines the results are not consistent (e.g., an amount of variability or variance from result-to-result that is greater than a tolerance threshold), the network security monitor can select the next best set of values. If the network security monitor determines the simulation is consistent and good (e.g., an amount of variability or variance from result-to-result that is less than a tolerance threshold), the network security monitor can save the set of values and proceed with tuning the next case (e.g., case #2—the network security monitor can use the clustering algorithm to check if the incoming record IP is not a threat). Thus, the by the end of the tuning process, the network security monitor can identify, generate or select eight different sets of values for eight different cases.

Figure 5:
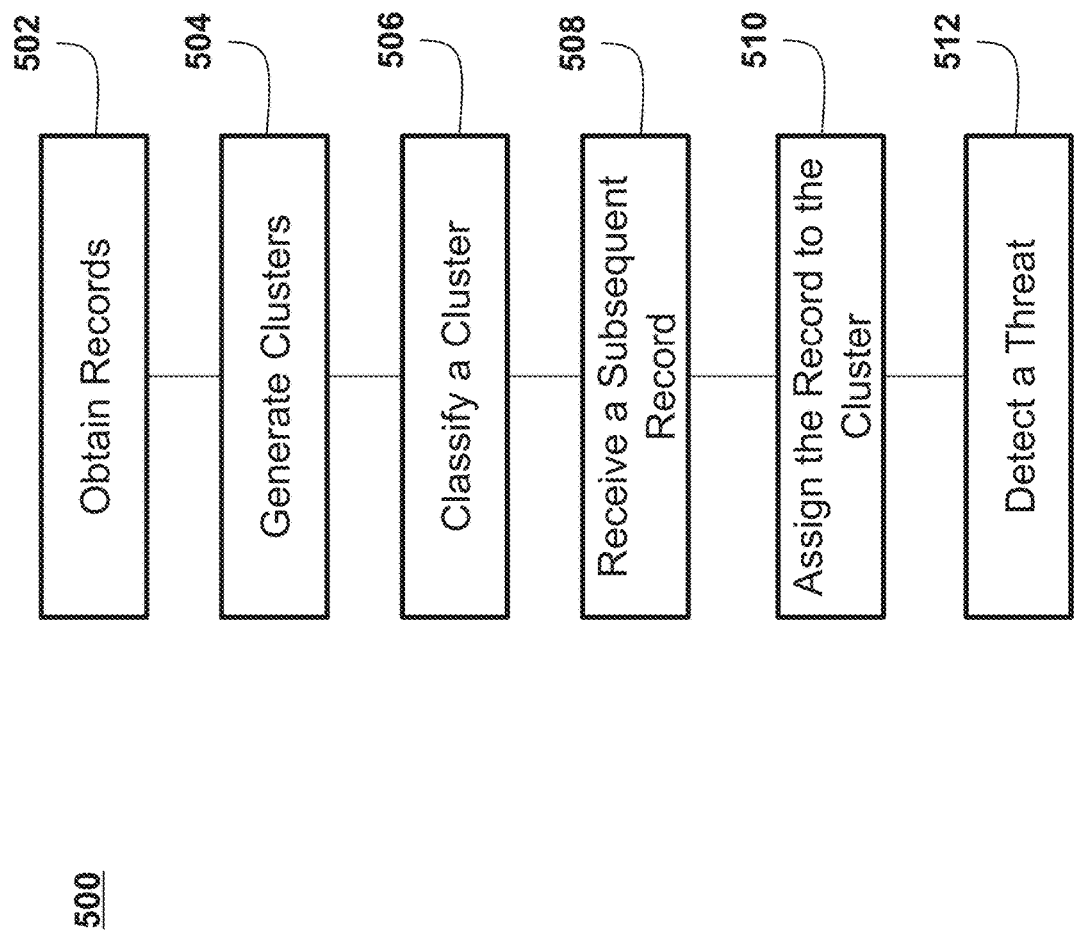
FIG. 5 illustrates a method of detecting threats in a network, in accordance with an embodiment.

Referring now to FIG. 5, a method of detecting threats in a network in accordance with an embodiment is shown. The method 500 can be performed by one or more system or component depicted in FIGS. 1A-1D or FIG. 2, including, for example, a network security monitor, data collection component, cluster generation component, or classifier component. In brief overview, the method 500 includes a network security monitoring obtaining records at step 502. At step 504, the network security monitor generates cluster. At step 506, the network security monitor classifies a cluster. At step 508, the network security monitor receives a subsequent record. At step 510 the network security monitor assigns the record to the cluster. At step 512, the network security monitor detects a threat.

Still referring to FIG. 5, and in further detail, the network security monitoring obtains records at step 502. The network security monitor can obtain records from entities that access a network. The entities can be distributed on the network or centralized. For example, some of the entities can be distributed across one or more types of networks, such as a private network or external network. Some of the entities can be centralized on the network, such as in a physical data center. The entities can include network entities or network elements such as devices, network nodes, gateways, etc. The records can include attributes associated with the one or more entities. The attributes can refer to raw logs that are normalized and parsed. The network security monitor can extract attributes about several network entities and aggregate the attributes about the several entities. The network security monitor can extract the aggregated attributes at a desired time. The network security monitor can use the aggregated attributes during the whole process. Aggregated attributes can include, for example, averages, sums, counts, unique counts and min/max values.

The network security monitor can generate or use weights. For example, the data collected and analyzed by the network security monitor can include many attributes. Some of these aggregated attributes may be more important (or influential) than others. This importance can be translated as the "weight" of the attribute (or variable). The network security monitor can take the weight into an account during the decision process.

The network security monitor can transform the attributes. For example, the transformation can include standardizing or scaling the attributes and then multiplying the attributes by the weight assigned to the attribute. Thus, the behavior can refer to the collection of aggregated and non-aggregated attributes about an entity (e.g., IPs, domains, mails, devices, connections, etc.).

At step 504, the network security monitor generates cluster. The network security monitor can generate clusters from the records using a matching process. The network security monitor can use the matching process to group records based on attributes into a cluster. For example, the network security monitor can use pattern recognition technique or a k-NN technique to form the clusters from the records.

The network security monitor can generate or identify clusters and assign records to the identified clusters. Clusters can refer to groups of records that are similar to each other. Each group can include records that are similar to each other. Each group can have a number of records. If the number of records in the group satisfies a threshold, then the group may be considered a standard group or normal group. If the number of records is less than a threshold or minimum number of records, then the group can be considered an outlier (e.g., the records in the group can form a set of outliers).

The records can indicate behavior of a network node or network element, such as the number of network connections at a node, which countries the connections are with, how many ports are being used, how a node has been communicating with other nodes, etc.

The network security monitor can create the clusters using a fixed cluster creation technique or a variable cluster creation technique. In fixed cluster construction, the network security monitor can identify a priori the number of clusters to create. For example, an administrator or user of the network security monitor can provide or otherwise indicate the number of cluster to create. The number of clusters to create can be stored in database. In variable cluster construction, the network security component can determine the number of clusters to create based on a set of parameters. For example, the network security monitor can determine an optimal or beneficial number of clusters to create. The optimal or beneficial number of clusters to create can be based on the types of records identified, the desired amount of cluster separation, or resource availability (e.g., processing capacity, memory availability, bandwidth usage). In some cases, the network security monitor can apply a machine learning technique or tuning technique to determine the optimal number of clusters to create.

To create the clusters of records, the network security monitor performs a matching process. In the matching process, the network security monitor can compare records with each other. The network security monitor can compare two or more records. Each record can include multiple columns or variables. Each variable can be associated with a weight. For example, if the variables are numeric then the result if the matching can be numeric in the interval [0 . . . 1]. If the variable is Boolean, then the result of the matching can be 1 if the two attributes identical and 0 if the two attributes are not identical to each other.

In some cases, the network security monitor, when generating clusters, can determine that one or more records may not match or may not be a good fit for a cluster. Responsive to determining that one or more records do not match with the clusters based on the matching process, the network security monitor can generate a second or different cluster, and assign the record to the second cluster.

At step 506, the network security monitor classifies a cluster. For example, the network security monitor can classify a first cluster as a threat cluster or as exhibiting threatful behavior or otherwise comprising a characteristic indicative of threatful behavior. The network security monitor can use a pattern recognition technique to classify the cluster. For example, the classifier component can be configured with a k-Nearest Neighbors technique ("k-NN"). K-NN can refer to a non-parametric technique used for classification. In both variable cluster construction and fixed cluster creation, the input can include the k closest training examples in the feature space. The output can be a class membership. The network security monitor can classify an object by a majority vote of its neighbors, with the object being assigned to the class most common among its k nearest neighbors. In some cases, the value of k can be specified. In some cases, the network security monitor can dynamically assign the value of k.

Classifying the clusters or generating the clusters can include testing, tuning, or validating the cluster. For example, the network security monitor can validate a cluster based on comparing a ratio of threats to records with a threshold. The network security monitor can determine the ratio of threat records to the number of total records. If the threat ratio is above a threshold, and the record is a threat, then the network security monitor can mark the clustering as a success. If the ratio of normal records to the number of total records is above a threshold and the record is normal, then the network security monitor can mark the clustering as a success. Otherwise, the network security monitor can mark the clustering as a failure.

At step 508, the network security monitor receives a subsequent record. The network security monitor can receive the subsequent record from a network entity. The network security monitor can receive a record that may or may not include attribute information used to form the clusters. For example, the network security monitor can receive a record with partial information. The network security monitor can receive partial information from a network entity or element. The network security monitor can request information from the network entity, and receive the record responsive to the request. The network entity can push the record to the network security monitor. Receiving the record subsequent to generation of the clusters can include receiving the record at some time after one or more clusters have been generated in that the network security monitor may already have created clusters and classified the clusters, and the network security monitor can match the new record with one of the clusters, or determine to create a new cluster. In some cases, the entity associated with the subsequent record can be different from the entities used to generate the plurality of clusters. For example, the network security monitor may not have received a record from the entity when creating the clusters.

At step 510 the network security monitor assigns the record to the cluster. The network security monitor can assign the record to the first cluster using the matching process. The network security monitor can use the matching process to assign the record to the cluster. The network security monitor can weight attributes in the record prior to matching. The network security monitor can match the record to the cluster based on a k-NN technique or fuzzy logic technique. The network security monitor can match the record to the cluster using attributes that can include non-numeric attributes or numeric attributes.

In some cases, the network security monitor can perform a tuning process to identify, via a multivariable loop, one or more variables to use to match the record with the first cluster corresponding to the threat cluster. For example, after the network security monitor examines all the variables, the network security monitor can create a multivariable loop in order to check all possible values for all possible variables. This may generate a large number of possible solutions. Since some of the solutions may be irrelevant and some of the solutions may be highly relevant, the network security monitor can select the variables that provide the best results (e.g., high recall and precision) when matching a new record with the clustering system to find out if the new record is a threat or not.

After the network security monitor selects the best values to find the threats of an IP, the network security monitor can use these values to simulate the system multiple times (e.g., 25 times, 50 times, 75 times, 100 times, 150 times, 200 times or more) to determine a level of consistency in the results. If the network security monitor determines the results are not consistent (e.g., an amount of variability or variance from result-to-result that is greater than a tolerance threshold), the network security monitor can select the next best set of values. If the network security monitor determines the simulation is consistent and good (e.g., an amount of variability or variance from result-to-result that is less than a tolerance threshold), the network security monitor can save the set of values and proceed with tuning the next case (e.g., case #2—the network security monitor can use the clustering algorithm to check if the incoming record IP is not a threat). Thus, the by the end of the tuning process, the network security monitor can identify, generate or select eight different sets of values for eight different cases.

At step 512, the network security monitor detects a threat. The network security monitor can detect that the network entity associated with the record may exhibit threatful behavior, be under threat, or currently be malfunctioning or under attack in some way.

While the invention has been particularly shown and described with reference to specific embodiments, it should be understood by those skilled in the art that various changes in form and detail may be made therein without departing from the spirit and scope of the invention described in this disclosure.

What is claimed is:

1. A method of detecting threats in a network, comprising:
   obtaining, by a network security monitor, a plurality of records for a plurality of entities that access the network, the plurality of records comprising attributes associated with the one or more entities;
   generating, by the network security monitor, a plurality of clusters from the plurality of records using a matching process;
   classifying, by the network security monitor, a first cluster of the plurality of clusters as a threat cluster;
   receiving, subsequent to generating the plurality of clusters, a record from an entity that access the network;
   assigning, by the network security monitor, the record to the first cluster using the matching process;
   detecting, by the network security monitor responsive to assigning the record to the first cluster, a threat associated with the entity; and
   performing a tuning process to identify, via a multivariable loop, one or more variables to use to match the record with the first cluster corresponding to the threat cluster.

2. The method of claim 1, wherein the entity is different from the plurality of entities used to generate the plurality of clusters.

3. The method of claim 1, wherein generating the plurality of clusters comprises:
   selecting, by the network security monitor, one of fixed cluster construction or variable cluster construction;
   identifying, responsive to the selection, a number of clusters to generate; and
   generating, responsive to identifying the number of clusters, the plurality of clusters corresponding to the number of clusters.

4. The method of claim 1, wherein the matching process comprises at least one of a fuzzy logic algorithm or a k-nearest neighbors technique, the method comprising;
   weighting the attributes associated with the one or more entities; and
   generating the clusters using the matching process and the weighted attributes.

5. The method of claim 1, wherein generating the plurality of clusters comprises:

determining that a first record of the plurality of records is a mismatch with the first cluster; and
generating a second cluster of the plurality of clusters; and
assigning the first record of the plurality of records to the second cluster.

6. The method of claim 1, comprising:
determining that an attribute of the record is a non-numeric attribute; and
using Boolean logic to match the attribute with the first cluster.

7. The method of claim 1, comprising:
determining that an attribute of the record comprises a numeric value; and
using fuzzy logic to match the numeric value of the attribute with the first cluster.

8. The method of claim 1, comprising:
determining that an attribute of the record comprises a numeric value; and
determining an average value for the first cluster based on assigning the numeric value of the attribute of the record to the first cluster; and
updating a center value of the first cluster based on the average value.

9. The method of claim 1, comprising:
validating the first cluster based on comparing a ratio of threats to records with a threshold.

10. A system for detecting threats in a network, comprising:
a network security monitor comprising one or more processors and memory;
a data collector of the network security monitor configured to obtain a plurality of records for a plurality of entities that access the network, the plurality of records comprising attributes associated with the one or more entities;
a cluster generator of the network security monitor configured to generate a plurality of clusters from the plurality of records using a matching process; and
a classifier of the network security monitor configured to classify a first cluster of the plurality of clusters as a threat cluster,
wherein the network security monitor is further configured to:
receive, subsequent to generating the plurality of clusters, a record from an entity that communicates via the network;
assign the record to the first cluster using the matching process;
detect, responsive to assigning the record to the first cluster, a threat associated with the entity; and
perform a tuning process to identify, via a multivariable loop, one or more variables to use to match the record with the first cluster corresponding to the threat cluster.

11. The system of claim 10, wherein the entity is different from the plurality of entities used to generate the plurality of clusters.

12. The system of claim 10, wherein the network security monitor is further configured to:
select one of fixed cluster construction or variable cluster construction;
identify, responsive to the selection, a number of clusters to generate; and
generate, responsive to identifying the number of clusters, the plurality of clusters corresponding to the number of clusters.

13. The system of claim 10, wherein the matching process comprises at least one of a fuzzy logic algorithm or a k-nearest neighbors technique, and the network security monitor is further configured to:
weight the attributes associated with the one or more entities; and
generate the clusters using the matching process and the weighted attributes.

14. The system of claim 10, wherein the network security monitor is further configured to:
determine that a first record of the plurality of records is a mismatch with the first cluster;
generate a second cluster of the plurality of clusters; and
assign the first record of the plurality of records to the second cluster.

15. The system of claim 10, wherein the network security monitor is further configured to:
determine that an attribute of the record is a non-numeric attribute; and
use Boolean logic to match the attribute with the first cluster.

16. The system of claim 10, wherein the network security monitor is further configured to:
determine that an attribute of the record comprises a numeric value; and
use fuzzy logic to match the numeric value of the attribute with the first cluster.

17. The system of claim 10, wherein the network security monitor is further configured to:
determine that an attribute of the record comprises a numeric value; and
determine an average value for the first cluster based on assigning the numeric value of the attribute of the record to the first cluster; and
update a center value of the first cluster based on the average value.

18. The system of claim 10, wherein the network security monitor is further configured to:
validate the first cluster based on comparing a ratio of threats to records with a threshold.

* * * * *